US009929933B1

(12) United States Patent
Viljoen (10) Patent No.: US 9,929,933 B1
(45) Date of Patent: Mar. 27, 2018

(54) LOADING A FLOW TABLE WITH NEURAL NETWORK DETERMINED INFORMATION

(71) Applicant: Netronome Systems, Inc., Santa Clara, CA (US)

(72) Inventor: Nicolaas J. Viljoen, Cambridge (GB)

(73) Assignee: Netronome Systems, Inc., Santa Clara, CA (US)

( * ) Notice: Subject to any disclaimer, the term of this patent is extended or adjusted under 35 U.S.C. 154(b) by 317 days.

(21) Appl. No.: 14/841,717

(22) Filed: Sep. 1, 2015

(51) Int. Cl.
*H04B 10/00* (2013.01)
*H04L 12/751* (2013.01)
*H04B 10/27* (2013.01)
*H04L 29/06* (2006.01)
*H04J 14/00* (2006.01)

(52) U.S. Cl.
CPC ............. *H04L 45/02* (2013.01); *H04B 10/27* (2013.01); *H04L 69/22* (2013.01)

(58) Field of Classification Search
CPC ......... H04Q 11/0066; H04Q 2011/005; H04Q 2011/0064; H04Q 2011/0073; H04Q 2213/054; H04Q 2213/13343; H04Q 2213/343; H04L 45/08
See application file for complete search history.

(56) References Cited

U.S. PATENT DOCUMENTS

| | | | |
|---|---|---|---|
| 6,490,248 B1 * | 12/2002 | Shimojo | H04L 12/5601 370/229 |
| 8,484,022 B1 | 7/2013 | Vanhoucke | 704/240 |
| 2011/0313961 A1 * | 12/2011 | Toscano | H04L 45/08 706/14 |
| 2016/0105364 A1 * | 4/2016 | Kanonakis | H04L 47/10 370/235 |

OTHER PUBLICATIONS

Helios: A Hybrid Electrical/Optical Switch Architecture for Modular Data Centers by N. Farrington et al., SIGCOMM'10, Aug. 30-Sep. 3, 2010, ACM 978-1-4503-0201—Feb. 10, 2008, copyright 2010.

* cited by examiner

*Primary Examiner* — Daniel Dobson
(74) *Attorney, Agent, or Firm* — Imperium Patent Works; T. Lester Wallace; Amir V. Adibi

(57) ABSTRACT

A flow of packets is communicated through a data center. The data center includes multiple racks, where each rack includes multiple network devices. A group of packets of the flow is received onto an integrated circuit located in one of the network devices. The integrated circuit includes a neural network and a flow table. The neural network analyzes the group of packets and in response determines if it is likely that the flow has a particular characteristic. The neural network outputs a neural network output value that indicates if it is likely that the flow has a particular characteristic. The neural network output value, or a value derived from it, is included in a flow entry in the flow table on the integrated circuit. Packets of the flow subsequently received onto the integrated circuit are routed or otherwise processed according to the flow entry associated with the flow.

21 Claims, 10 Drawing Sheets

NETWORK FLOW PROCESSOR

DATA CENTER
FIG. 1

FIG. 2

OPTICAL SWITCH
CONNECTIVITY
FIG. 3

VLAN PACKET
FIG. 5

| OPTICAL SWITCH SOURCE DESTINATION PAIR ||  NUMBER OF ELEPHANT FLOWS |
| --- | --- | --- |
| SOURCE TOR | DESTINATION TOR | |
| 1 | 2 | # |
| 2 | 1 | # |
| 1 | 3 | # |
| 3 | 1 | # |
| 1 | 4 | # |
| 4 | 1 | # |
| 1 | 5 | # |
| 5 | 1 | # |
| 1 | 6 | # |
| 6 | 1 | # |
| 2 | 3 | # |
| 3 | 2 | # |
| 2 | 4 | # |
| 4 | 2 | # |
| 2 | 5 | # |
| 5 | 2 | # |
| 2 | 6 | # |
| 6 | 2 | # |
| 3 | 4 | # |
| 4 | 3 | # |
| 3 | 5 | # |
| 5 | 3 | # |
| 3 | 6 | # |
| 6 | 3 | # |
| 4 | 5 | # |
| 5 | 4 | # |
| 4 | 6 | # |
| 6 | 4 | # |
| 5 | 6 | # |
| 6 | 5 | # |

ELEPHANT FLOW COUNT DATA STRUCTURE

FIG. 4

NETWORK DEVICE

FIG. 6

NETWORK FLOW PROCESSOR

FIG. 7

FLOW TABLE

FIG. 8

ONE FLOW ENTRY STORED IN ONE ENTRY FIELD OF THE FLOW TABLE

FIG. 9

FEATURE VECTOR TABLE

FIG. 10

$$Y = \frac{e^x - e^{-x}}{e^x + e^{-x}}$$

ACTIVATION FUNCTION

FEED FORWARD BACK PROPAGATION
TO DETERMINE NEW SET OF WEIGHT VALUES

FIG. 13

$$W3,1\text{-}1_{T1} = W3,1\text{-}1_{T0} - (\eta \frac{A - P3,1^2}{2})$$

NEW PERCEPTRON 3,1 WEIGHT VALUE FUNCTION

FIG. 14

$$W3,2\text{-}1_{T1} = W3,2\text{-}1_{T0} - (\eta \frac{A - P3,2^2}{2})$$

NEW PERCEPTRON 3,2 WEIGHT VALUE FUNCTION

FIG. 15

NEW PERCEPTRON 2,1 WEIGHT VALUE FUNCTION

FIG. 16

NEW PERCEPTRON 2,2 WEIGHT VALUE FUNCTION

FIG. 17

NEW PERCEPTRON 1,1 WEIGHT VALUE FUNCTION

FIG. 18

LOADING A FLOW TABLE WITH NEURAL NETWORK DETERMINED INFORMATION

TECHNICAL FIELD

The disclosed embodiments relate generally to network switching and neural networks.

BACKGROUND

Optical circuit switching has been incorporated into data centers employing electrical packet switches. The article "Helios: A Hybrid Electrical/Optical Switch Architecture for Modular Data Centers" by N. Farrington et al., SIG-COMM'10, Aug. 30-Sep. 3, 2010, ACM 978-1-4503-0201-2/10/08, copyright 2010, describes a hybrid electrical/optical data center switch architecture capable of effectively combining the benefits of both optical circuit switching and electrical packet switching, and delivering the same performance as a fully-provisioned packet-switched network for many workloads but at significantly less cost, less complexity (number of cables, footprint, labor), and less power consumption. The Helios hybrid electrical/optical switch architecture uses hardware flow counters to classify each flow as either a mouse flow or an elephant flow. The subset of traffic best suited to circuit switching is identified. Based on these classifications and flow measurements, the optical circuit elements of the hybrid electrical/optical system are reconfigured dynamically to prevent bottlenecks.

SUMMARY

A system is part of a larger data center. The system includes a row of racks of network equipment. A top-of-rack (TOR) switch is installed in the top of each rack. In each rack, below the TOR, there are installed a column of network devices. Each of these network devices of a rack is connected by one or more network cables to the TOR at the top of the rack. In addition, the TORs are interconnected to one another by one or more electrical packet switches. A packet output by a TOR can be switched by the electrical packet switch so that it is communicated to any desired one of the other TORs of the other racks. Likewise, packets originating from another of the TORs can be switched through the electrical packet switch so that the packet is supplied to the TOR. In operation of the system, a stream of packets originating from a source network device in one rack may be communicated up to the TOR of that rack, and then may be communicated through the electrical packet switch to another TOR of another rack, and on to a destination network device located down in the other rack. In this way, packets can be communicated between any two network devices in the system.

An additional optical circuit switch is provided in the system. The optical circuit switch is coupled by individual unidirectional optical links to each of the TORs. The optical circuit switch is more limited than the electrical packet switch in the way it switches, in that packets received on a given one of its ports can only be output from one of its other ports. In addition, a given port of the optical switch can only be either an input port or an output port. The optical switch can be coupled to a given TOR by more than one optical link such that one of the optical links can be used to receive packets on the optical switch and such that the other of the optical links can be used to output packets from the optical switch. Each port of the optical switch is only usable to receive, or to output. The unidirectional connections made through the optical switch from one port to another port can be changed. The optical switch is circuit switched in such a way that it provides relatively fixed, but high speed and high bandwidth, communication paths between pairs of TORs. Once the optical switch has been set up, the flow of packets into the optical switch via an input port, and through the optical switch, and out of the optical switch through an output port, is fast as compared to the electrical packet switch or switches of the system.

In a first novel aspect, a network device in one of the racks includes a neural network. The neural network analyzes a group of packets of a flow passing through the network device and in response determines if it is likely that the flow has a particular characteristic. The neural network outputs a neural network output value that indicates if it is likely that the flow has a particular characteristic. The neural network output value, or a value determined therefrom, is included into a flow entry for the flow. The flow entry, that includes the neural network determined information, is then stored into a flow table in the network device. Packets of the flow that are subsequently received onto the network device are routed according to the flow entry associated with the flow.

In a second novel aspect, a group of packets of a flow is received onto an integrated circuit located in a first network device. The integrated circuit includes a neural network. The neural network analyzes the group of packets and in response outputs a neural network output value. The neural network output value is used to determine how the packets of the flow are to be output from a second network device. In one example, the second network device is a TOR. Each packet of the flow output by the first network device is output along with a tag to the second network device. The tag is indicative of the neural network output value. The second device uses the tag to determine which output port located on the second device is to be used to output each of the packets. Accordingly, neural network determined information as determined on a first network device is used to direct packet flow through the second network device. This tagging of a packet need not involve a VLAN tag, but rather can take various forms including the providing of a special header or header bits onto the packet, or the providing of an additional header, or the inclusion of a special bit or bits into the payload of the packet.

In a third novel aspect, a group of packets of a flow is received onto a network device, where the network device in turn includes a first device and a second device. The first device (for example, an NFP integrated circuit) includes a neural network. The first device generates a neural network feature vector (NNFV) based on the received packets. The first device then sends the NNFV to the second device (for example, a CPU of a host processor). The second device uses the NNFV to determine a set of optimized weight values for the neural network. The second device may, for example, be a general purpose processor that determines the set of optimized weight values by executing neural network training software. Once determined, the set of optimized weight values is sent from the second device to the first device. The first device loads the set of optimized weight values into its neural network. The neural network then uses the set of optimized weight values to analyze flows that subsequently pass through the first device. In other examples, the first and second devices are not parts of the same network device, but rather are separate network devices themselves, or are other different types of devices.

In a fourth novel aspect, a flow of packets is communicated within a data center, where the data center includes an electrical switch, an optical switch, and multiple racks each including multiple network devices. The optical switch can be controlled to receive packet traffic from a network device via a first optical link and to output that packet traffic to another network device via a second optical link. One network device includes a neural network that analyzes received packets of the flow. The optical switch is made to switch based on a result of the analysis performed by the neural network. In one instance, the optical switch is controlled such that immediately prior to the switching no packet traffic passes from the network device via the first optical link and through the optical switch and via the second optical link to the other network device but such that after the switching packet traffic does pass from the network device via the first optical link and through the optical switch and via the second optical link to the other network device. Neural network generated information from one or more neural networks of the network devices of the system is communicated to a central functionality. The central functionality uses the information from all these network devices to populate an elephant flow count data structure. The central functionality then uses the elephant flow count data structure to determine how to control the optical switch. For example, the optical switch can be controlled so that the most elephant flows possible flow through the optical switch. The central functionality can be located anywhere in the data center, but in one example it is disposed in the electrical switch. In one example, the neural networks that generate the information used by the central functionality are located in network devices down in the various different racks, and the information generated by these network devices is forwarded through top-of-rack switches to the central functionality.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figures 1, 2, 3, 5:
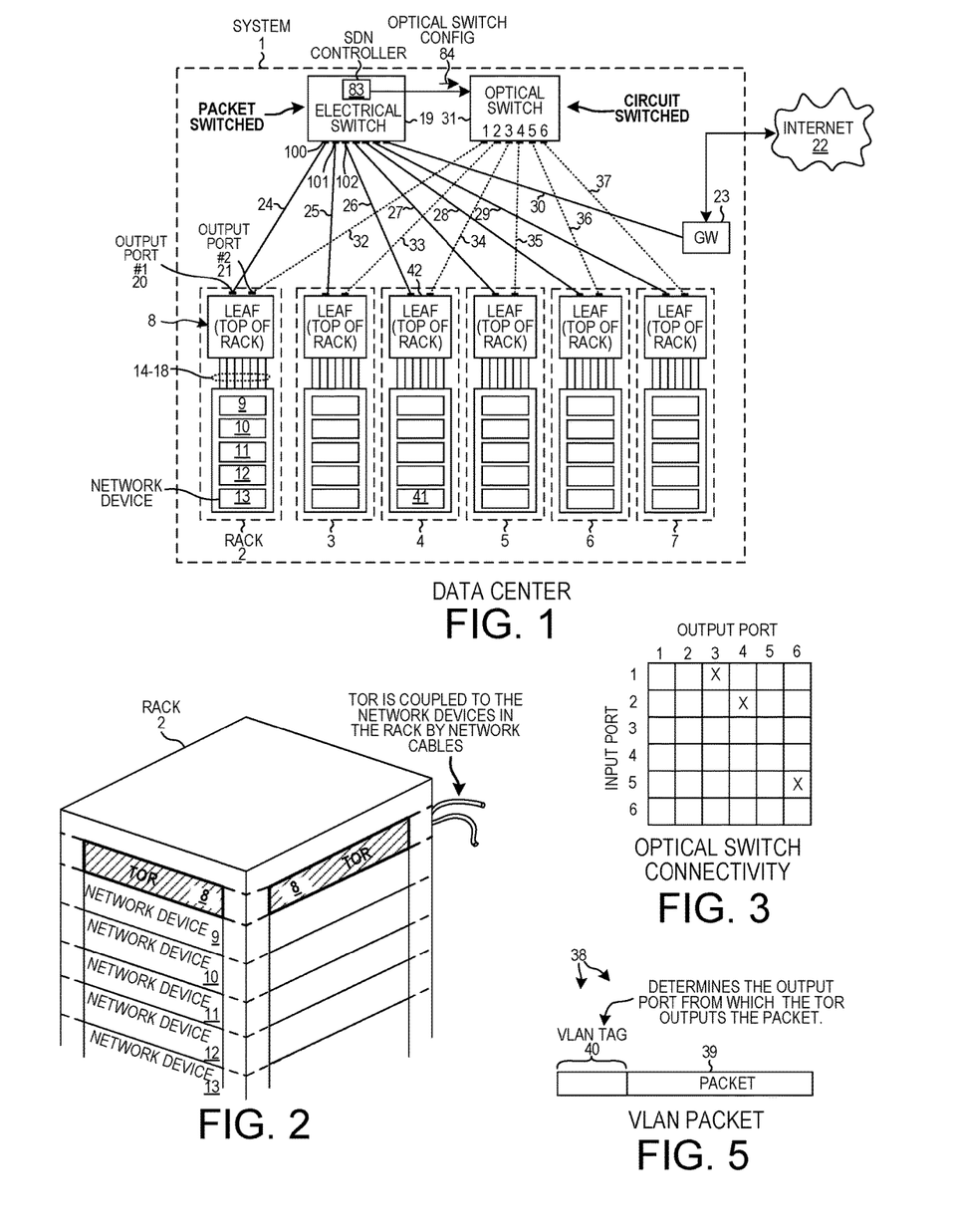
FIG. 1 is a diagram of a data center system that includes multiple server racks connected to an electrical switch and an optical switch.
FIG. 2 is a diagram of a single rack including a Top-Of-Rack (TOR) switch.
FIG. 3 is a diagram that illustrates connectivity provided by the optical switch.
FIG. 5 is a diagram of a packet with an appended virtual LAN (VLAN) tag.

FIG. 1 is a diagram of system 1 in accordance with one novel aspect. In the illustrated example, the system is part of a larger data center. The system 1 includes a row of racks 2-7 of network equipment. A network device, referred to here as a top-of-rack switch (TOR), is installed in the top of each rack. TOR 8 is the top-of-rack switch for rack 2.

FIG. 2 is a diagram that shows TOR 8 installed in the top slot of rack 2. In each rack, below the TOR, there are installed a column of network devices. Each of these network devices of a rack is connected by one or more network cables to the TOR at the top of the rack. In the case of rack 2, reference numerals 9-13 identify the column of network devices. Reference numerals 14-18 identify network cables that couple each network device to the TOR. In addition, the top-of-rack switches are interconnected to one another by one or more electrical switches. Only one such electrical switch 19 is illustrated in FIG. 1, but it is understood that there may be several such switches, and layers of switches, that can fulfill the function of interconnecting the top-of-rack switches. In the case of such a switch 19 that is directly connected to each of a plurality of top-of-rack switches, a packet output by top-of-rack switch 8 can be switched by the switch 19 so that it is communicated to any desired one of the other top-of-rack switches of racks 3-7. Likewise, packets of originating from another of the top-of-rack switches can be switched through the switch 19 so that the packet is supplied to top-of-rack switch 8. In operation of the system 1, a stream of packets originating from a source network device in one rack may be communicated up to the top-of-rack switch of that rack, and then may be communicated through the electrical switch 19 to another top-of-rack switch of another rack, and on to a destination network device located down in the other rack. In this way, packets can be communicated between any two network devices in the system 1.

Such packets might be received onto switch 19, so that they are individually switched by switch 19 based on packet header information, to individual destinations on a per packet basis. For example, a first packet received from TOR 8 onto switch 19 via input port 100 may be switched out of switch 19 from output port 101, whereas the very next packet received onto switch 19 via the same input port 100 may be switched out of switch 19 from a different output port 102. In addition to communication between network devices of the system 1, packets can be communicated to and from the external internet 22 via a gateway device 23. Each of the links 24-30 in FIG. 1 represents a bidirectional cable communication link. The link can be either an optical fiber network cable or a metal conductor network cable. In the case of an optical fiber network cable, there are multiple fibers for communication in one direction, and there are multiple fibers for communication in the opposite direction. Likewise, in the case of a metal conductor network cable, there are multiple conductors for communication in one direction, and there are multiple conductors for communication in the opposite direction.

In such a system, bottlenecks can develop where large amounts of data and packets are supplied across a single link to an electrical switch, such as electrical switch 19, and the communication through the switch 19 then slows down due to the switch having to determine, on a packet by packet basis, the destination for each packet. Also, if the packets are large, the large amount of data flowing through the electrical switch 19 can slow down communication through the switch.

An additional optical switch 31 is provided that is connected by individual unidirectional optical links 32-37 to each of the top-of-rack switches of the system. The optical switch 31 is more limited that the electrical switch 19 in the way it switches, in that packets received on a given one of its ports can only be output from one of its other ports. In addition, a given port of the optical switch can only be either an input port or an output port. Although not shown in FIG. 1, the optical switch 31 can be coupled to a given TOR by more than one optical link such that one of the optical links can be used to receive packets on the optical switch and such that the other of the optical links can be used to output packet from the optical switch. The optical switch is effectively a crossbar. Each port is only usable to receive, or to output. The connections made through the optical switch from one port to another port can be changed, but making the change is relatively slow. For a stream of packets received onto the optical switch, each of which is destined for a different top-of-rack switch, the optical switch is too slow to switch its optical connections for each successive one of the packets of the stream. The optical switch 31 is therefore circuit switched in such a way that it provides a relatively fixed, but high speed and high bandwidth, communication path between pairs of top-of-rack switches. Once the optical switch 31 has been set up, however, the flow of packets into the switch via a set up input port, and through the optical switch, and out of the optical switch through a set up output port, is fast. A rapid succession of large packets can be sent between the corresponding pair of top-of-rack switches through the communication path afforded by the optical switch without the backup problems that an electrical switch would have. The communication paths afforded by the optical switch are not, however, switched rapidly on a packet by packet basis, but rather the optical switch is configured less frequently such that large numbers of packets of different flows pass across each communication path. The optical switch 31 is circuit switched, whereas the electrical switch 19 is packet switched.

Optical switch 31 is configured by a Software Defined Network (SDN) controller 83. In one example, the SDN controller 83 is a part of the electrical switch 19. In operation, the SDN controller 83 receives information about flows from each of the network devices of each of the racks, and compiles that information, and then uses that information to determine how to control the optical switch 31 so as to eliminate bottlenecks in the system 1. The information about flows may be supplied from the network devices that originate the information, through the TORs (that forward the information) and to the SDN controller 83. In one specific example, as explained in further detail below, each network device includes a neural network that analyzes packets, and the information about flows that is used by the SDN controller 83 are results of the analysis performed by these neural networks. SDN controller 83 supplies optical switch configuration instructions 84 to the optical switch 31 in the form of specially recognized instruction packets that are communicated using the same networking techniques used to intercommunicate between the switches. The illustration of the SDN controller 83 being disposed in the electrical switch 19 is just an example. The SDN controller 83 that controls the optical switch 31 could be located anywhere in the data center.

FIG. 3 is a diagram that illustrates the three communication paths provided by optical switch 31. In this particular type of optical switch, communications received onto port 1 of the optical switch 31 are output onto port 3 of the optical switch 31, but are output onto no other port. Communications received onto port 2 of the optical switch are output onto port 4 of the optical switch, but are output onto no other port. Communications received onto port 5 of the optical switch are output onto port 6 of the optical switch, but are output onto no other port. Each port of the optical switch 31, in this example, is unidirectional.

Figure 4:
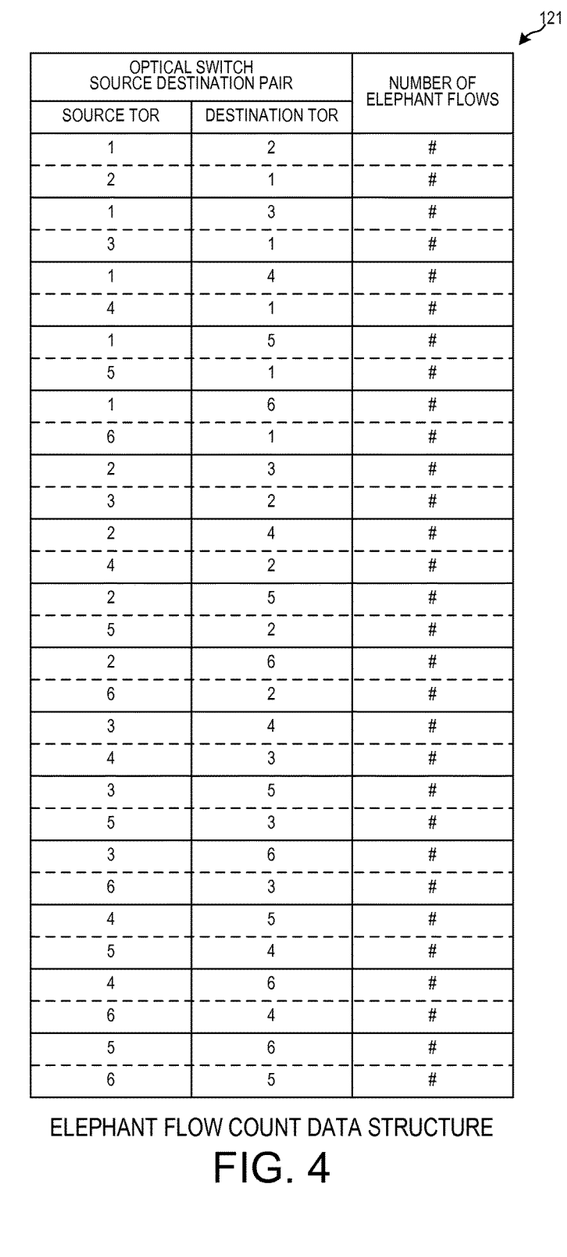
FIG. 4 is a diagram of an elephant flow count data structure.

The dashed lines 32-37 in FIG. 1 represent unidirectional optical links. FIG. 4 is a diagram illustrating an elephant flow count data structure 121. The elephant flow count data structure 121 includes a count of elephant flows for each possible unidirectional optical link between a Top-Of-Rack (TOR) and a TOR pair. The optical switch can only provide connectivity between three such pairs at any one moment in time. In one example, the three source-destination pairs that carry the largest number of elephant flows are determined and a switch configuration instruction is sent to the optical switch so to configure the optical switch to make the three connections identified as carrying the largest number of elephant flows. In the present embodiment, the elephant flow count data structure is maintained in memory in the SDN controller 83.

FIG. 5 is a diagram that illustrates how a packet can be tagged so that it will be directed along a desired communication path. The overall packet 38 includes a tag 40 that has been appended to the packet 39. The TOR 8 receives such packets from the network devices in its rack 2 and uses the tag of each packet to determine whether to forward the associated packet out of output port 20 or out of output port 21. Accordingly, a network device in one rack can use these tags to cause a flow of packets to be sent through the optical switch 31 and to a desired network device located in another rack. For example, network device 13 can cause a flow of packets to be sent to network device 41 by attaching an appropriate tag to each packet of the flow. The tag of one of these packets causes the TOR 8 to output the packet from its output port 21. The tagged packet therefore flows across optical link 32 to port 1 of the optical switch 31. The optical switch 31 acts as a crossbar for unidirectional links, and as indicated in FIG. 3, outputs the packet from its port 3. Due to the connection of optical link 34, the packet is communicated to the TOR 42 of the third rack 4, and is in turn communicated from the TOR 42 to the destination network device 41. The originating network device 13 can, however, cause other packets of other flows to be output from the TOR 8 to the electrical switch 19. To do this, the network devices attach different tags to these packets such that the TOR 8 outputs these packets onto output port 20. In this way, if a high bandwidth flow is to be sent from a network device in one rack to a network device in another rack, then the originating network device attaches appropriate tags onto the packets of the flow such that the packets are directed to optical switch 31. If, however, a low bandwidth flow is to be sent from a network device in one rack to a network device in another rack, then the originating network device attaches appropriate tags onto the packets of the low bandwidth flow such that the packets are directed to the electrical switch 19. By segregating out high bandwidth flows, and by sending the identified high bandwidth flows through the optical switch 31, congestion through the electrical switch 19 is avoided. Such a high bandwidth flow may be referred to as an "elephant flow". Depending on the actual implementation, an elephant flow can be defined in a somewhat different way and to have somewhat different characteristics. In the particular example of FIG. 1 described here, an elephant flow is a flow with an averaged bandwidth greater than a threshold bandwidth value. The threshold value is set depending on the particular network devices in the system, data usage, and other factors. The threshold value in the present example is an average bandwidth of 10 Gbps. Although FIG. 5 illustrates a VLAN tag 40 being used to direct the packet to a selected one of the electrical switch 19 and the optical switch 31, another type of tag or header or flag could be used.

Figure 6:
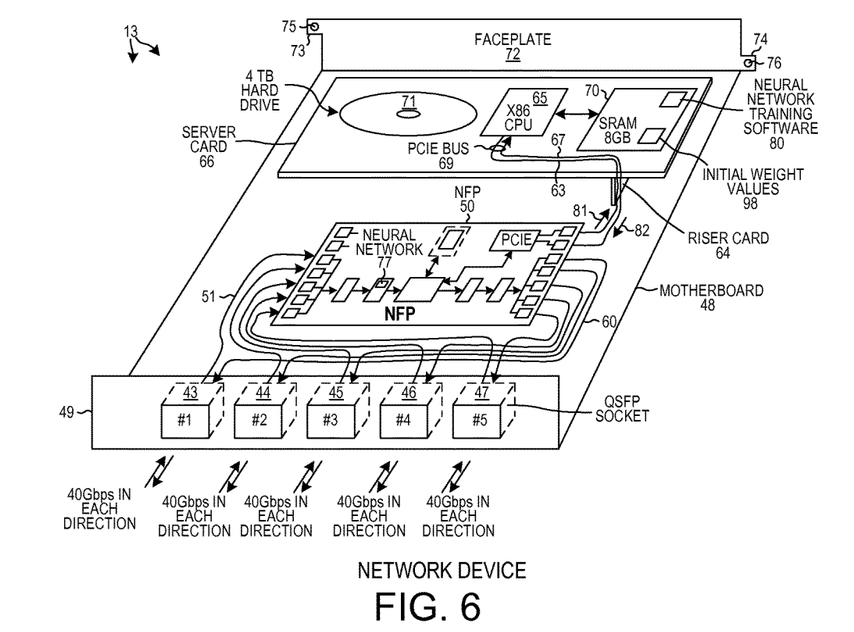
FIG. 6 is a diagram of a network device including multiple QSFP sockets, a Network Flow Processor (NFP) integrated circuit, and a server card.

FIG. 6 is a perspective diagram of network device 13. The network device 13 is shown with its top outer panel of its housing removed in order to show the components disposed within the housing. Network device 13 has five QSFP cable sockets 43-47 into which network cables can be plugged. Each QSFP cable socket has a 38-pin angle connector that extends from the bottom of the socket and that is soldered to the motherboard 48. The QSFP sockets are accessible from the backside of the network device 13 at the backplate 49. A particular QSFP socket can receive a plug end of an optical network cable, where the plug at the end of the optical network cable includes optical transceiver circuitry, or the QSFP socket can receive a plug end of a non-optical network cable, where the plug at the end of the non-optical network cable does not include any optical transceiver circuitry. In either case, the QSFP socket is the same, just the type of network cable plugged into it differs. Communication across a network cable affords 40 Gbps communication in both directions. In addition to the QSFP sockets, the networking device 13 includes a novel network flow processor integrated circuit 50 (NFP) that is mounted to the motherboard 48.

Figure 7:
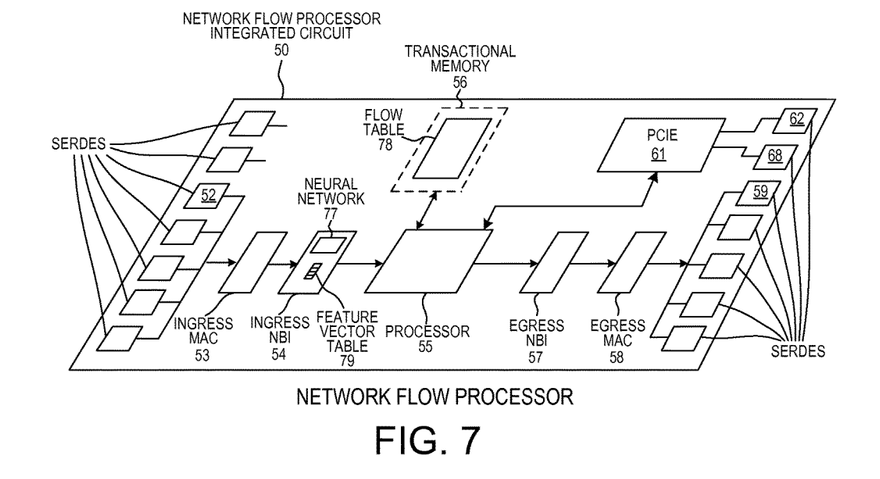
FIG. 7 is a more detailed diagram of the Network Flow Processor (NFP) integrated circuit of FIG. 6.

FIG. 7 is a more detailed diagram of the NFP integrated circuit 50 in the network device of FIG. 6. In one example, a packet received onto the network device 13 via QSFP socket 43 passes to NFP 50 via conductors 51, and passes through a SerDes circuit 52, then through an ingress MAC circuit 53, and to an ingress NBI circuit 54. A timestamp is generated by the ingress MAC circuit 53 indicating the time when the packet was first received by the NFP.

The ingress NBI circuit 54 generates a hash value from the 5-tuple (IP source address, IP destination address, TCP source port, TCP destination port, protocol) of the packet. The packet and hash value pass from the ingress NBI circuit 54 to a processor 55. The processor 55 supplies the hash value and the packet header including the 5-tuple to transactional memory 56, and causes the transactional memory 56 to perform a flow table lookup operation. The flow table lookup operation looks into the flow table 78 and identifies a flow entry for the flow of the packet, where the flow entry includes a result value, and where the result value indicates an NFP output port from which the packet will be output. In the case where the NFP output port corresponds to QSFP socket 43, the packet may pass from the processor 55, through an egress NBI circuit 57, through an egress MAC circuit 58, through a SerDes circuit 59, and across conductors 60, and back to QSFP socket 43. A packet received onto the network device 13 via any one of the QSFP sockets can be processed by the NFP 50 and can be made to go out of the network device 13 via any desired one of the QSFP sockets, in accordance with the result value of the flow table flow entry for the flow of the packet. In addition, a packet or other information can be passed from the processor 55, through a PCIe circuit 61, and a SerDes circuit 62, and across conductors 63, and across a riser card 64, to the Central Processing Unit (CPU) 65 of a host server card 66. Similarly, a packet or other information can pass the other direction from the CPU 65, via conductors 67, across the riser card 64, and into the NFP 50, and through the SerDes circuit 68, and through the PCIe circuit 61, and to the processor 55 of the NFP. The CPU of the host server card 66 and the NFP 50 intercommunicate in this way back and forth across the PCIe bus 69. The host server card 66, in addition to CPU 65, includes 8 GB of SRAM 70 and a 4 TB spinning hard disk 71. SRAM 70 is a non-transitory computer-readable medium. In one example, the PCIe circuit 61 is implemented as is described in: U.S. patent application Ser. No. 14/172,862, entitled "TRANSACTIONAL MEMORY THAT IS PROGRAMMABLE TO OUTPUT AN ALERT IF A PREDETERMINED MEMORY WRITE OCCURS", filed Feb. 4, 2014, by Gavin J. Stark and Rolf Neugebauer (the subject matter of this patent document is incorporated herein by reference). The programmable lookup circuit 276 is an instance of the CAMR 32 lookup algorithm as described in: U.S. patent application Ser. No. 13/598,448, entitled "TRANSACTIONAL MEMORY THAT PERFORMS A CAMR 32-BIT LOOKUP OPERATION", filed Aug. 29, 2012, by Gavin J. Stark; (the subject matter of which is incorporated herein by reference).

Reference numeral 72 identifies the faceplate of the housing, and reference numeral 49 identifies the backplate of the housing. To install the network device 13 into a slot in rack 2, the network device is slid into the slot from the faceplate side of the rack so that the host server device slides along rails of the slot until the ears 73 and 74 on the faceplate 72 abut vertical members of the rack. The ears 73 and 74 of the faceplate are then bolted to the rack by bolts that extend through bolt holes 75 and 76.

In accordance with one novel aspect, the NFP integrated circuit 50 includes a neural network 77, a flow table 78 that includes neural network determined values (or, more broadly, neural network determined information), and a neural network feature vector table 79. The CPU of the server card 66 executes neural network training software code 80. The neural network training software code is a set of processor executable instructions that carries out the method illustrated in FIG. 13. The neural network training software code 80 is stored in SRAM 70. Initial weight values 98 are also stored in SRAM 70. In accordance with one novel aspect, NFP 50 monitors packet traffic and logs information about that traffic in the form of a set of Neural Network Feature Vectors (NNFVs) 81. The NNFVs, as they are generated, are stored in the feature vector table 79. The set of NNFVs 81 is then communicated across the PCIe bus 69 from the NFP 50 to the CPU 65. The CPU 65 executes the neural network training software 80 and uses the initial weight values 98 and the set of NNFVs 81 to generate a set of neural network weight values 82. The set of neural network weight values 82 is a set of better or optimized weight values, which if used in the neural network 77 would result in the neural network having a lower error rate than if the neural network were to use the initial weight values. The set of neural network weight values 82 is communicated from the CPU 65 back to the NFP 50, and the set of neural network weight values 82 is loaded into the neural network 77 on the NFP. After the neural network 77 has been loaded with the set of neural network weight values 82, the neural network 77 is used on the NFP 50 to analyze packet data. As packets pass through the NFP 50, information about the various packets continues to be logged into the feature vector table 79, but the feature vector table 79 logs information about many more flows other than just the subset of flows used to train the neural network. For a given flow, after forty packets of the flow have passed through the NFP, the NNFV (Neural Network Feature Vector) for the flow is complete. The forty packets logged in the NNFV are forty consecutively received packets. The forty packets might be the first forty packets of the flow, or alternatively, might be forty consecutive packets not including the first packet of the flow. The NNFV is supplied as an input to the neural network 77, and the neural network has been loaded with the optimized set of weight values 82. As a result, the neural network 77 outputs a single-bit neural network output value. This neural network output value may, for example, indicate whether the flow is likely to be an elephant flow. This information may be used to route the packet. In addition, a neural network determined value, that is determined by the neural network output value, is made a part of a flow entry that is loaded into the flow table for flow. Due to the neural network determined information being present in the flow table, when a subsequent packet of the flow is received onto the NFP, the flow table lookup operation for that packet will result in the flow entry being identified, and the neural network determined value in the identified flow entry indicates that the packet likely is a packet of an elephant flow. In this way, neural network determined information about whether a flow has a particular characteristic (for example, whether the flow is likely to be an elephant flow or is likely to be a certain type of elephant flow between two specific locations) is loaded into the flow table and is used later to determine how other packets of the flow will be handled.

Figure 8:
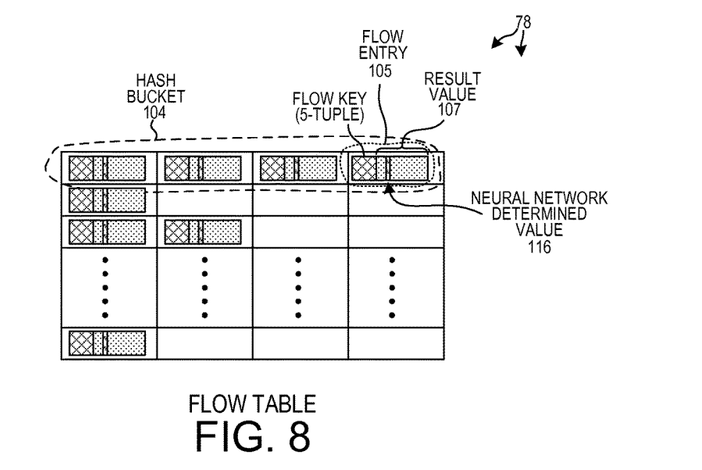
FIG. 8 is a diagram of the flow table 78 in the NFP integrated circuit of FIG. 7.
Figure 9:
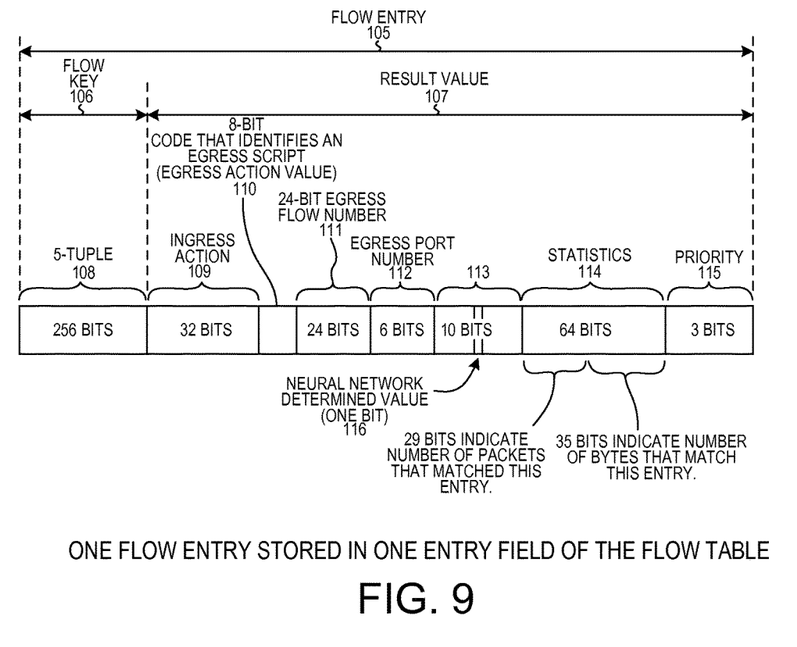
FIG. 9 is a diagram of one flow entry 105 that is stored in one entry field of the flow table 78 of FIG. 8.

FIG. 8 is a diagram that illustrates the flow table 78 in further detail. The flow table comprises a set of hash buckets. In the diagram, each row of the flow table 78 is a different hash bucket. A hash bucket in this example comprises four entry fields. Each entry field may be vacant, or may be occupied by a flow entry. In the case of hash bucket 104, all its four entry fields are occupied. All the flow entries are of the same form. As indicated by FIG. 9, flow entry 105 includes a flow key portion 106, and a result value portion 107. The result value 107 in turn includes multiple portions 109-115, including a neural network determined value 116. The neural network determined value 116 is a bit that indicates whether the corresponding flow has been determined to have a particular characteristic, or has been determined to be likely to have a particular characteristic. In the present example, such a bit being set indicates that it is likely that the corresponding flow is an "elephant flow". Initially, at system start up, all the "neural network determined value" bits of all the flow entries are cleared. As the NFP operates and receives and processes packets of a flow, the NFP uses a heuristic to determine whether the flow is an elephant. In one example, if the sum of the packet sizes of the packets of the flow during a predetermined period of time exceeds a predetermined sum, then the particular flow is determined by the heuristic to be an elephant flow and the bit 116 for the flow in the flow table is set. In this way, over time, the bits 116 in the flow table are set using the heuristic. When a packet is received by the NFP, a hash value is generated by the ingress NBI circuit 54 as described above, and this hash value is used to index into the flow table 78 and to identify a hash bucket. The 5-tuple of the packet is then compared to the flowkey of each occupied flow entry in the hash bucket. If the flow key of a flow entry matches the 5-tuple of the packet, then the result value of the flow entry is output and is used to determine how to output the packet and/or otherwise process or handle the packet. In the case where the neural network determined value 116 is set by the heuristic, the result of the heuristic is used by the system to determine how to process and output the packet. As the system is used and more packets flow through the NFP, the heuristic is used to set more and more of the neural network determined value bits in the flow table.

Figure 10:
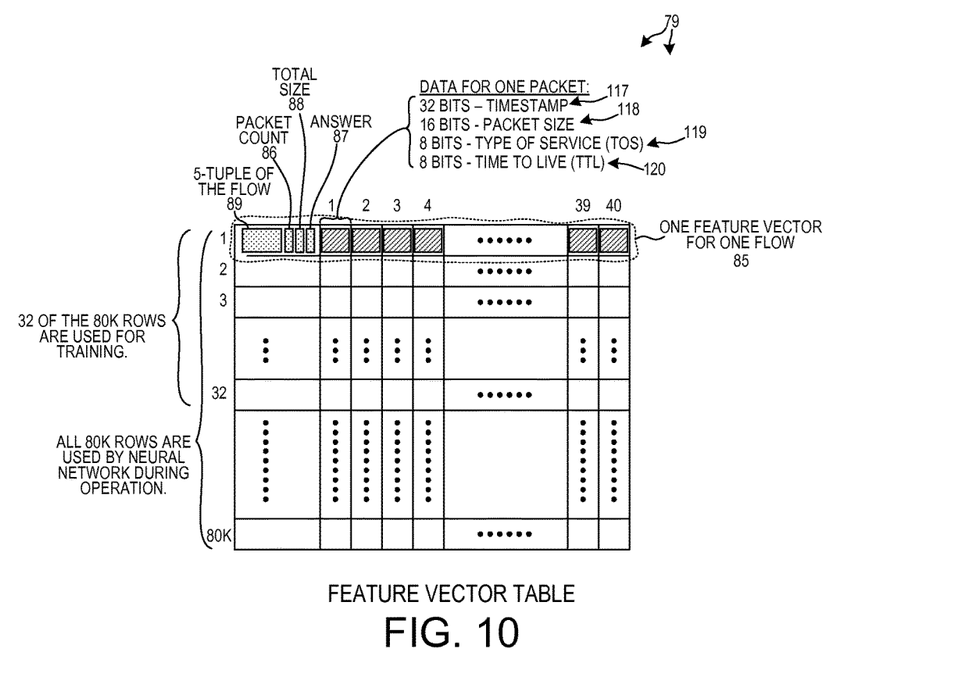
FIG. 10 is a diagram of the feature vector table 79 in the NFP integrated circuit of FIG. 7.

FIG. 10 is a more detailed diagram of the feature vector table 79. Each row in the feature vector table 79 is a Neural Network Feature Vector (NNFV) for a different flow. Reference numeral 85 identifies one NNFV. All of the NNFVs are of the same form. The first 128-bits of the NNFV is the 5-tuple 89 of the flow. The next 8 bits is a packet count value 86. The next 8 bits is a total size value 88. The total size value 88 is a number that records the total aggregated size of all packets that have been received to date on this flow. The next bit 87 is an answer value. The answer value is the result of the heuristic and indicates whether the heuristic has determined that the flow has the particular characteristic. If by this analysis it is determined that the flow has the particular characteristic (for example, that the flow is an "elephant" flow), then the answer value bit is set, otherwise the answer value bit remains cleared. Next, the row of the feature table for the feature vector has forty fields. Each of these fields stores information pertaining to a corresponding respective one of forty packets of the flow. As each packet of the flow is received and passes through the NFP, data about that packet is logged into the feature vector table. Information logged for a packet includes: 1) a 32-bit timestamp value 117, 2) a 16-bit packet size value 118, 3) an 8-bit Type Of Service (TOS) value 119, and 4) an 8-bit Time To Live (TTL) value 120. Over time, as the NFP operates, the NFP builds an NNFV for each flow it handles.

There are a great many NNFVs in the feature vector table 79, but thirty-two of them are indicated to be sample flows. The NNFVs for these sample flows are referred to as "sample NNFVs". Once the NNFVs of these thirty-two sample flows are complete, then the set 81 of these thirty-two NNFVs is sent from the NFP 50 across the PCIe bus 69 to the host CPU 65. Neural network training software 80 maintains a software implementation of the neural network 77.

Figure 11:
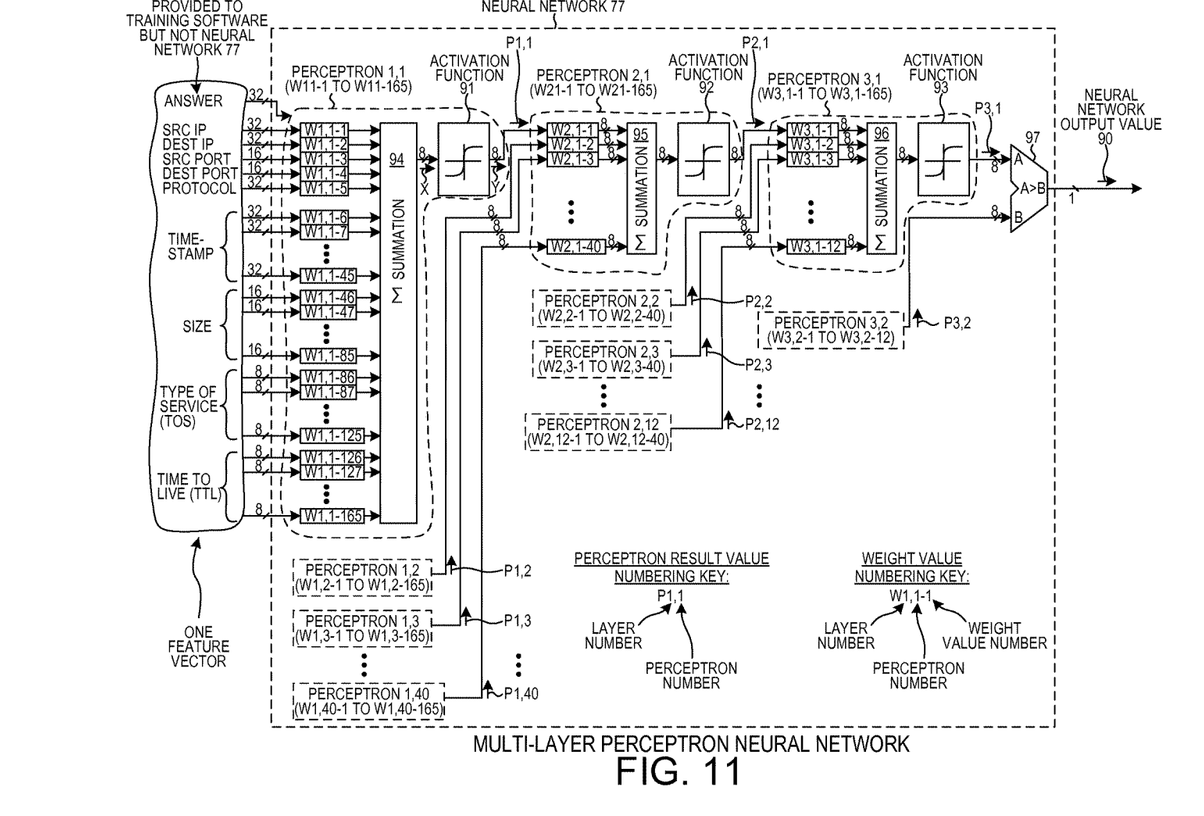
FIG. 11 is a diagram of the multi-layer perceptron neural network 77 that is disposed in the ingress NBI circuit in the NFP integrated circuit of FIG. 7.
Figure 12:
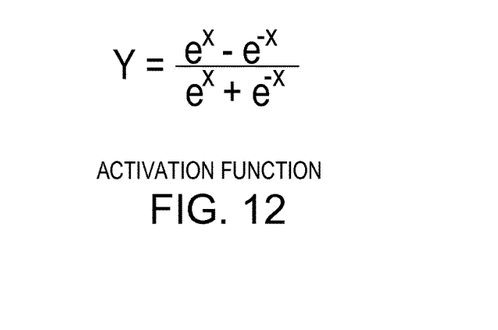
FIG. 12 is the equation for the activation function used in the multi-layer perceptron neural network 77 of FIG. 11.

FIG. 11 is a diagram of the neutral network 77 as implemented in software by the neural network training software 80. The software-implemented neural network is loaded with three layers of weight values, where each weight value is an 8-bit value. A set of input values from a NNFV is supplied as inputs to the neural network at the left of the diagram of FIG. 11. The neural network 77 includes three different layers of perceptrons. Each layer includes at least two perceptrons. The first layer of the neural network includes forty perceptrons (1,1 to 1,40). In the labels used here, the first "1" indicates the layer number, and the second "1" following the comma indicates the perceptron number in that layer. The second layer of the neural network includes twelve perceptrons (2,1 to 2,12). And the third layer of the neural network includes two perceptrons (3,1 and 3,2). In a perceptron, each input value is multiplied by a corresponding weight value, and all of the resulting weighted input values are summed to generate an 8-bit summation value. For example, in the first layer, the summation block 94 of perceptron 1,1 outputs an 8-bit summation value X. The 8-bit summation value "X" is then input to an activation function 91. FIG. 12 sets forth the activation function used in this example. The function is the hyperbolic tangent function (tan h). The output Y of the activation function 91 is the 8-bit perceptron result value P1,1 of the perceptron 1,1.

The 8-bit perceptron result values P1,1 through P1,40 of all forty perceptrons in the first layer are supplied as forty input values to each perceptron in the second layer. In the second layer, perceptron 2,1 performs a summation 95 of the weighted perceptron result values of the first layer, and supplies the sum to its activation function 92. The 8-bit output of activation function 92 is the perceptron result value P2,1 of perceptron 2,1. The 8-bit perceptron result values P2,1 through P2,12 of all twelve perceptrons of the second layer are supplied as twelve input values to each perceptron in the third layer. There are two perceptrons in the third layer. Perceptron 3,1 performs a summation 96 of the weighted perceptron result values of the second layer, and supplies the sum to its activation function 93. The 8-bit perceptron result value P3,1 is passed to the A input of comparator 97. The 8-bit perceptron result value P3,2 is passed to the B input of comparator 97. The A>B output value as output by comparator 97 is a single bit answer value 90 that is "1" when the output of perceptron 3,1 is greater than the output of perceptron 3,2, and "0" otherwise. The algorithmic processing represented by the structure in FIG. 11 is implemented in software form in the neural network training software 80.

Figure 13:
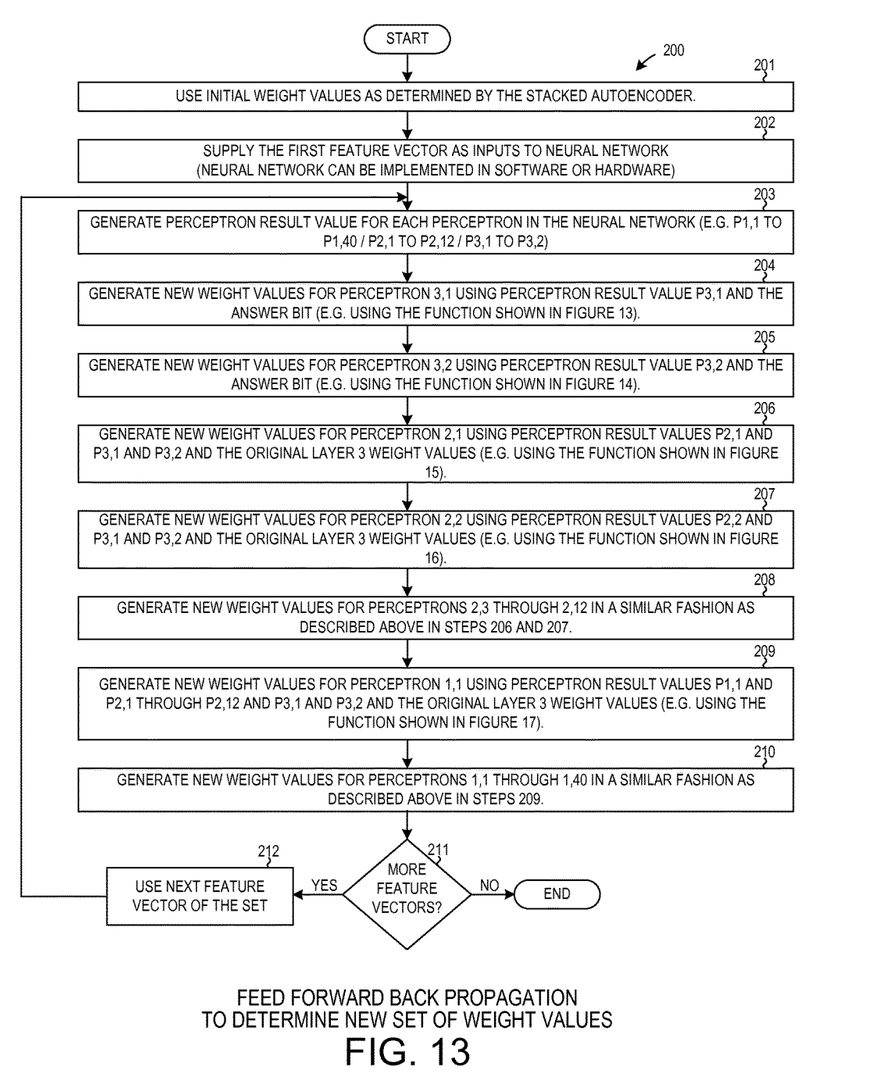
FIG. 13 is a flowchart describing steps performed in a Feed Forward Back Propagation (FFBP) method of determining a set of new weight values for the multi-layer perceptron neural network 77 of FIG. 11.

FIG. 13 is a flowchart illustrating the steps in a training method 200 that uses the NNFVs to generate a better or optimized set of weight values using Feed Forward Back Propagation (FFBP).

In step 201, the set 98 of initial weight values is loaded into the software-implemented neural network. In one example, the set 98 of initial weight values is determined by a stacked autoencoder. See: U.S. Pat. No. 8,484,022, entitled "Adaptive Auto-Encoders", filed Jul. 27, 2012, by Vincent Vanhoucke, for a description of a stacked autoencoder (the subject matter of which is incorporated herein by reference).

In step 202, the values of the first NNFV of the set 81 are supplied as inputs to the software-implemented neural network. The answer bit of the first NNFV was determined as described above by the heuristic on the NFP 50.

In step 203, the software perceptrons of the multi-layer perceptron neural network executes and in response to the first feature vector generates a perceptron result value (P1,1 to P1,40; P2,1 to P2,12; and P3,1 to P3,2).

Figure 14:
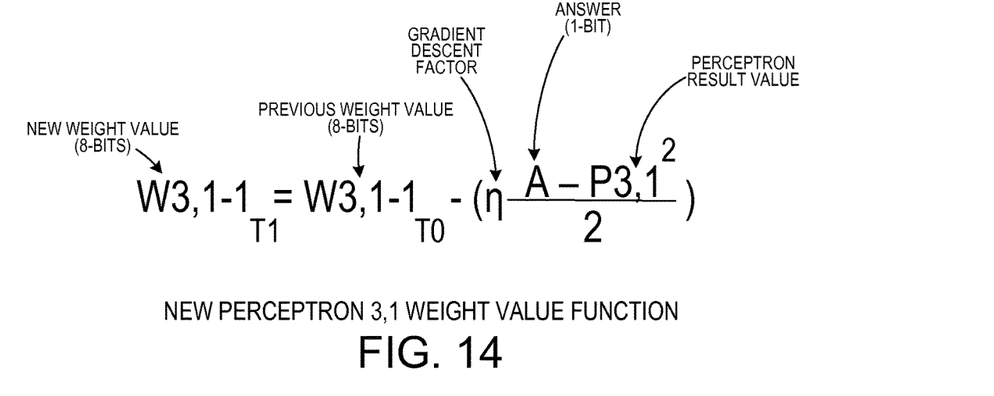
FIG. 14 is a new weight value function used to determine new weight values for perceptron 3,1.

In step 204, new weight values for perceptron 3,1 are generated using perceptron result value P3,1 and the answer bit. For example, a new weight value $W3,1-1_{T1}$ is determined using the formula set forth in FIG. 14. The gradient descent factor is 0.8 for this, and all, calculations. The value A is the single-bit answer of the first NNFV. The value $W3,1-1_{T0}$ is the weight value that is being replaced. In this case, of the first iteration through the FFBP process, the $W3,1-1_{T0}$ is the initial W3,1-1 weight value. This formula is applied for each weight value of the 3,1 perceptron.

Figure 15:
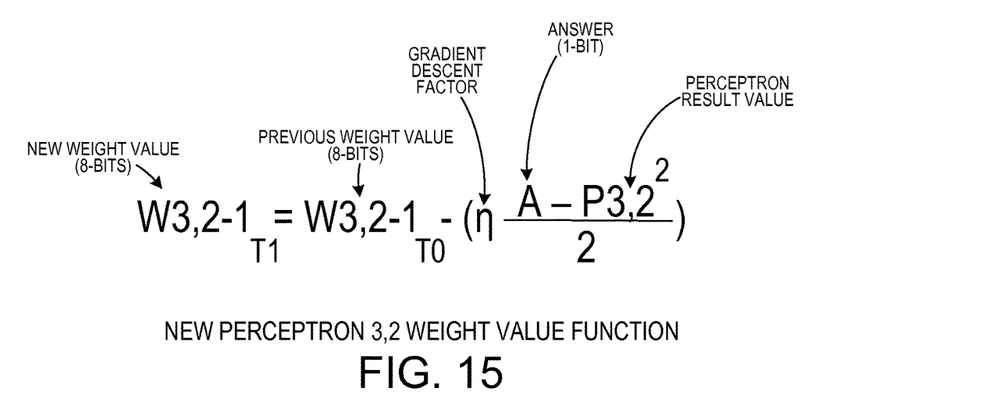
FIG. 15 is a new weight value function used to determine new weight values for perceptron 3,2.

In step 205, new weight values for perceptron 3,2 are generated using perceptron result value P3,2 and the answer bit. For example, the new weight value $W3,2-1_{T1}$ is determined using the formula set forth in FIG. 15. The gradient descent factor is 0.8 for this, and all, calculations. The value A is the single-bit answer of the first NNFV. The value $W3,2-1_{T0}$ is the weight value that is being replaced. In this case, of the first iteration through the FFBP process, the $W3,2-1_{T0}$ is the initial W3,2-1 weight value. This formula is applied for each weight value of the 3,2 perceptron. At this point in the process, new weight values have been determined for all weight values in the third layer.

Figure 16:
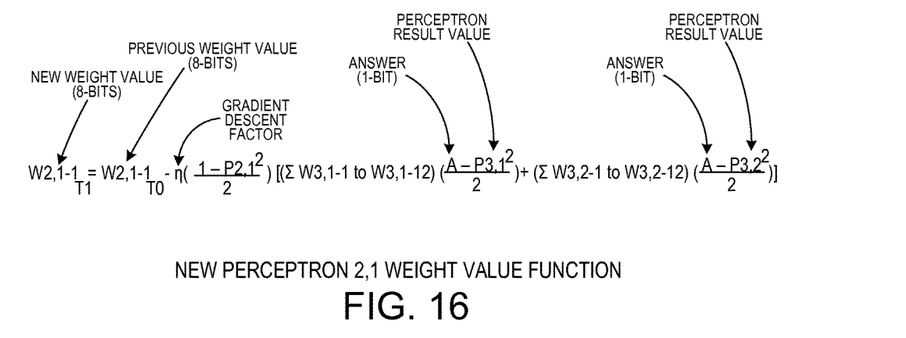
FIG. 16 is a new weight value function used to determine new weight values for perceptron 2,1.

In step 206, new weight values for perceptron 2,1 are generated using perceptron result values P2,1 and P3,1 and P3,2 and the original (initial) layer 3 weight values. For example, the new weight value $W2,1-1_{T1}$ is generated utilizing the function described in FIG. 16. The (ΣW3,1-1 to W3,1-12) quantity is the summation of all the initial weight values W3,1-1 to W3,1-12. The (ΣW3,2-1 to W3,2-12) quantity is the summation of all the initial weigh values W3,2-1 to W3,2-12. The $W2,1-1_{T0}$ is the weight value that is being replaced. The gradient descend factor is 0.8. This formula is applied for each weight value of the 2,1 perceptron.

Figure 17:
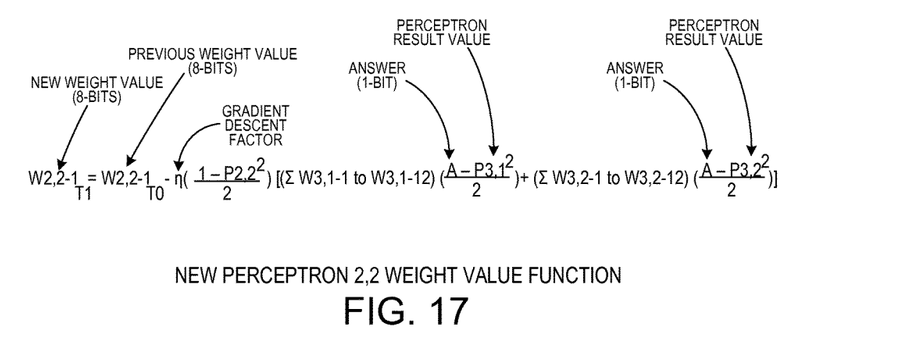
FIG. 17 is a new weight value function used to determine new weight values for perceptron 2,2.

In step 207, new weight values for perceptron 2,2 are generated using perceptron result values P2,2 and P3,1 and P3,2 and the original (initial) layer 3 weight values. For example, the new weight value $W2,2-1_{T1}$ is generated utilizing the function described in FIG. 17. The (ΣW3,1-1 to W3,1-12) quantity is the summation of all the initial weight values W3,1-1 to W3,1-12. The (ΣW3,2-1 to W3,2-12) quantity is the summation of all the initial weight values W3,2-1 to W3,2-12. The $W2,2-1_{T0}$ is the weight value that is being replaced. The gradient descent factor is 0.8. This formula is applied for each weight value of the 2,2 perceptron.

In step 208, this same thing is done for each of the remaining ten perceptrons of the twelve perceptrons of the second layer.

Figure 18:
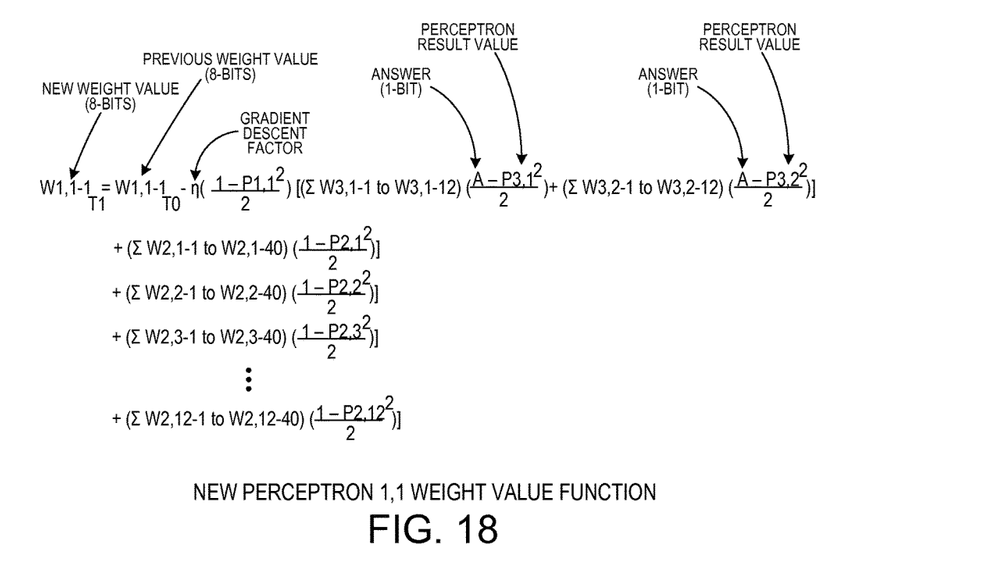
FIG. 18 is a new weight value function used to determine new weight values for perceptron 1,1.

In step 209, new weight values for perceptron P1,1 are generated using perceptron result values P1,1 and P2,1 through P2,12 and P3,1 and P3,2 and the original layer 3 weight values. For example, the new weight value $W1,1-1_{T1}$ is generated utilizing the function described in FIG. 18. All the weight values being summed are original (initial) weight values. The gradient descent factor is 0.8. This formula is applied for each weight value of the 1,1 perceptron.

In step 210, new weight values for perceptrons P1,1 through P1,40 are generated in a similar fashion as described above in step 209.

In step 211, it is determined if more feature vectors are available. If more feature vectors are available, then the flow transitions to step 212. In step 112, the next NNFV of the set 81 of NNFVs is supplied as inputs to the software-implemented neural network. The steps 202 through 212 are repeated, but in this pass through these steps the weight values in the formulas are the weight values determined by the last pass. In this way, the step 203 through 212 are repeated for each NNFV.

Once all the NNFV has been used, the decision at step 211 is that there are not more feature vectors (NNFVs) available, and the process ends. At this point, the set 82 current weight values are optimized weight values.

Next, the set 82 of optimized weight values is communicated from the host CPU 65 and across the PCIe bus 69 to the NFP 50. The set 82 of optimized weight values is then loaded into the hardware-implemented neural network 77 in the ingress NBI circuit 54. Thereafter, as the NFP operates and handles packets for other flows, the NFP records NNFVs for these other flows. When a NNFV for such another flow is complete, it is supplied as inputs to the hardware-implemented neural network 77. The hardware-implemented neural network 77 in turn generates a neural network determined output value 90, and this neural network output value is used to set the "neural network determined value" bit 116 in the flow entry for that flow in the flow table 78. The initial value of bit 116, as it was set by the heuristic method, is now overwritten with the neural network determined value. (Although the neural network implemented in the NFP integrated circuit 50 is described here as a hardware-implemented neural network circuit, it is understood that in other embodiments the neural network as implemented in the NFP can be a software implementation in software, where the software is executed by a processor on the NFP, such as a MicroEngine (ME) processor. Alternatively, part of the processing required to carry out the neural network function is performed by dedicated hardware circuitry in the ingress NBI, whereas other processing required to carry out the neural network function are performed in software as executed by an ME.)

In the example being described here, the neural network 77 in the ingress NBI circuit 54 is a hardware implementation of the neural network illustrated in FIG. 11. When a NNFV for a flow is complete, it is supplied as an input to the neural network 77 such that the neural network 77 outputs a "neural network output value". Based on this value, the "neural network determined value" 116 for the flow is updated in the flow table, so that over time more and more of the bits 116 in the flow table are values that were determined by the neural network, and not the heuristic. As packets for the various flows are received by the NFP integrated circuit, these bits 116 in the flow entries in the flow table are available to indicate that the packet is of an elephant flow. In the case where the packet is to be sent from network device 13 to another network device in another rack of FIG. 1, the "neural network determined value" 116 in the flow entry causes the NFP to put an appropriate tag onto the packet, as the packet is output from the network device 13, so that the packet will be made to pass from TOR 8 and across the optical switch 31 on its way to the other network device in the other rack, as opposed to passing from TOR 8 and through the electrical switch 19 to the other network device in the other rack. If, however, the bit 116 in the flow entry were not set, then the NFP would forward the packet with a different tag so that the packet would be made to pass from TOR 8 and through the electrical switch 19 to the other network device in the other rack. The TOR 8 does not make determinations about whether the packet is of an elephant flow or not, it simply outputs packets from its output ports 20 and 21 in accordance with the tags of the packets as received from the network devices down in its rack.

In addition, the "neural network determined values" of the flow table being used by the NFP determine how to process and/or output packets. The "neural network determined values" for the many flows being handled by the NFP are also used by the system 1 to determine how the optical switch 31 should be configured. In one example, the SDN controller 83 uses all the "neural network determined values" of all the network devices of the system 1 to determine the three possible optical communication paths between the racks 2-7 that would carry the most elephant flows. As a result of making this decision based on the "neural network determined values", the optical switch 31 is configured to provide the three optical communication paths. Although the functionality in the data center that controls the optical switch 31 in this way is described here as being SDN controller 83 in the electrical switch 19, the functionality that makes this decision in other examples can be located in any one of multiple places. Regardless of where this functionality is physically located, the "neural network determined values" information from each of the many network devices of the system is forwarded to this one functionality so that the functionality can in turn make its decision on how to control the optical switch 31 based on the proper information. In one example, each network device sends information to the functionality, where the information is based at least in part on the "neural network determined values" and indicates a number of elephant flows going from the network device to each of the network devices in the system, and a number of elephant flows coming into the network device from each of the other network devices in the system. These numbers are supplied to the functionality, which in turn uses them to populate the elephant flow count data structure 121 of FIG. 4. In one novel aspect, the information in the elephant flow count data structure 121 is at least in part determined by neural networks in the network devices (for example, by neural network 77 of the ingress NBI circuit 54 in the network device 13 in rack 2).

To realize the hardware-implemented neural network 77 in the ingress NBI circuit of the NFP integrated circuit 50, the function of neural network 77 as explained in connection with FIG. 11 can be described in a hardware description language (such as CDL, Verilog, or VHDL) and a synthesis tool can be used to convert the hardware description language into a description of logic circuitry that carries out the logic function. The resulting description of digital logic circuitry can then be fabricated into physical digital logic circuitry along with the remainder of the NFP integrated circuit when the NFP integrated circuit 50 is fabricated. The complete neural network 77 of FIG. 11 may be expensive to realize in hardware and parts of the hardware may be unnecessary for a particular application. Accordingly, in another example, parts of the multi-layer perceptron that are less useful in generating an accurate output bit are excluded to reduce manufacturing cost of the NFP integrated circuit. In another example, portions of the overall processing required to carry out the neural network processing function is performed by dedicated combinatorial logic circuitry, whereas other parts of the processor are performed in software, for example by a MicroEngine (ME).

In yet another example, the neural network is not implemented in the NFP integrated circuit 50 as described above, but rather is implemented in a separate standalone integrated circuit that monitors traffic flow and communicates a signal indicating the likelihood of a particular type of elephant flow to the NFP integrated circuit. Such a standalone elephant-detecting neural network integrated circuit is of general applicability, and need not be used in conjunction with an NFP integrated circuit. The processing burden of training of the standalone elephant-detecting neural network integrated circuit may be offloaded from the standalone chip and may be carried out using spare software processing throughput of another processor or computer. For example, the standalone integrated circuit may forward a set of NNFVs to such a processor or computer, so that the processor or computer uses the NNFVs to generate a set of optimized weight values, and then the resulting set of optimized weight values is communicated back and is loaded into the standalone integrated circuit. The set of NNFVs may, for example, be communicated in one direction as a first packet or packets across a network connection and then the set of optimized weight values may be communicated back in the opposite direction as a second packet or packets across the same network connection. In some applications, the dynamics of the system is such that the neural network does not have to be reloaded with new weight values frequently, and the time penalty of communicating NNFVs and sets of optimized weight values back and forth between the standalone device and the computer that executes the training software is acceptable.

For additional detail on the ingress NBI circuit 54 and how to make a picoengine pool that analyzes incoming packets and generates hash values and forwards packets on to pools of processors, see: 1) U.S. patent application Ser. No. 14/267,298, entitled "Kick-Started Run-To-Completion Processor Having No Instruction Counter", filed May 1, 2014, by Gavin J. Stark; 2) U.S. patent application Ser. No. 14/311,222, entitled "Skip Instruction To Skip A Number Of Instructions On A Predicate", filed Jun. 20, 2014, by Gavin J. Stark; and 3) U.S. patent application Ser. No. 14/267,342, entitled "TABLE FETCH PROCESSOR INSTRUCTION USING TABLE NUMBER TO BASE ADDRESS TRANSLATION", filed May 1, 2014, by Gavin J. Stark (the subject matter of these three patent documents is incorporated herein by reference). For additional detail on transactional memory 56 and how to make a transactional memory that stores a flow table and performs flow table lookup operations, see: 1) U.S. patent application Ser. No. 13/598,448, entitled "TRANSACTIONAL MEMORY THAT PERFORMS A CAMR 32-BIT LOOKUP OPERATION", filed Aug. 29, 2012, by Gavin J. Stark; (the subject matter of which is incorporated herein by reference).

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   (a) receiving a plurality of packets of a flow onto an integrated circuit;
   (b) using a neural network on the integrated circuit to analyze the plurality of packets thereby generating a neural network output value; and
   (c) loading a flow entry for the flow into a flow table, wherein the flow entry includes the neural network output value, and wherein (a), (b) and (c) are performed by the integrated circuit.

2. The method of claim 1, wherein the neural network analyzes the plurality of packets in (b) and in so doing determines whether the flow likely has a particular characteristic, wherein the neural network output value generated in (b) is an indication of whether the flow likely has the particular characteristic, wherein the indication is a single bit, and wherein the single bit is a part of the flow entry that is loaded into the flow table in (c).

3. The method of claim 1, wherein the loading of the flow entry in (c) involves writing to a memory that stores the flow table, wherein just prior to the loading of (c) the flow table contained a flow entry, and wherein the loading of (c) involves writing to the memory such that only a part of the flow entry as stored in the memory is changed.

4. The method of claim 1, wherein the loading of the flow entry in (c) involves writing a complete new flow entry into an entry field of the flow table that just prior to the loading of (c) was unoccupied.

5. The method of claim 1, wherein the integrated circuit receives a plurality of packet flows, and wherein the integrated circuit generates a Neural Network Feature Vector (NNFV) for each of the plurality of flows.

6. The method of claim 1, wherein the neural network comprises a multi-layer perceptron circuit, and wherein the multi-layer perceptron circuit is an amount of combinatorial digital logic that includes no instruction-executing processor.

7. A method comprising:
   (a) receiving a plurality of packets of a flow onto an integrated circuit;
   (b) using a neural network on the integrated circuit to analyze the plurality of packets thereby generating a neural network output value;
   (c) using the neural network output value to determine a neural network determined value; and
   (d) loading a flow entry for the flow into a flow table, wherein the flow entry includes the neural network determined value, wherein (a), (b), (c) and (d) are performed by the integrated circuit.

8. The method of claim 7, wherein the neural network analyzes the plurality of packets in (b) and in so doing determines whether the flow likely has a particular characteristic, wherein the neural network output value generated in (b) is an indication of whether the flow likely has the particular characteristic, wherein the indication is a single bit, and wherein the neural network determined value in (c) is a multi-bit action value.

9. The method of claim 7, wherein the neural network analyzes the plurality of packets in (b) and in so doing determines whether the flow likely has a particular characteristic, wherein the neural network output value generated in (b) is an indication of whether the flow likely has the particular characteristic, wherein the indication is a single bit, and wherein the neural network determined value in (c) is a multi-bit tag.

10. The method of claim 7, wherein the neural network analyzes the plurality of packets in (b) and in so doing determines whether the flow likely has a particular characteristic, wherein the neural network output value generated in (b) is an indication of whether the flow likely has the particular characteristic, wherein the indication is a single bit, and wherein the neural network determined value in (c) is an identifier of an egress port.

11. The method of claim 7, wherein (b) involves:
   (b1) logging information about the flow and thereby generating a Neural Network Feature Vector (NNFV) for the flow; and
   (b2) supplying the NNFV as an input to the neural network such that the neural network outputs the neural network output value.

12. The method of claim 7, wherein the neural network comprises a multi-layer perceptron circuit, and wherein the multi-layer perceptron circuit is an amount of combinatorial digital logic that includes no instruction-executing processor.

13. A method comprising:
   (a) using a neural network to analyze a plurality of packets of a flow of packets and to generate a neural network output value, wherein the neural network output value is an indication of whether the flow likely has a particular characteristic; and
   (b) incorporating the neural network output value into a flow entry, wherein the flow entry is stored in a flow table.

14. The method of claim 13, wherein (a) and (b) are performed by a network device.

15. The method of claim 13, further comprising:
(c) reading the flow entry from the flow table;
(d) obtaining the neural network output value from the flow entry that was read out of the flow table in (c); and
(e) using the neural network output value as obtained in (d) to determine how to process a packet of the flow.

16. The method of claim 13, further comprising:
(c) reading the flow entry from the flow table;
(d) obtaining the neural network output value from the flow entry that was read out of the flow table in (c); and
(e) using the neural network output value as obtained in (d) to determine how to modify a packet of the flow.

17. An apparatus comprising:
means for using a neural network to analyze a plurality of packets of a flow of packets and for generating a neural network output value, wherein the neural network output value is an indication of whether the flow likely has a particular characteristic; and
means for storing a flow entry in a flow table, wherein the flow entry incorporates the neural network output value.

18. The apparatus of claim 17, wherein the means for using comprises the neural network and a neural network feature vector table.

19. The apparatus of claim 17, wherein the means for storing is a semiconductor memory.

20. The apparatus of claim 17, wherein the indication of whether the flow has a particular characteristic is an indication of whether the flow is likely to be an elephant flow.

21. The method of claim 13, further comprising:
(c) reading the flow entry from the flow table;
(d) obtaining the neural network output value from the flow entry that was read out of the flow table in (c); and
(e) using the neural network output value as obtained in (d) to determine an output port from which a packet of the flow will be output.

* * * * *